United States Patent
Casey

(10) Patent No.: US 7,895,965 B2
(45) Date of Patent: Mar. 1, 2011

(54) TRAY POSITION INDICATOR EXTENDING DOWN IN FRONT OF THE DRIVER WHEN THE TRAY IS IN RAISED POSITION

(76) Inventor: Craig Richard Casey, Nhulunbuy (AU)

( * ) Notice: Subject to any disclaimer, the term of this patent is extended or adjusted under 35 U.S.C. 154(b) by 125 days.

(21) Appl. No.: 12/095,391

(22) PCT Filed: Nov. 29, 2006

(86) PCT No.: PCT/AU2006/001808
§ 371 (c)(1),
(2), (4) Date: May 29, 2008

(87) PCT Pub. No.: WO2007/062465
PCT Pub. Date: Jun. 7, 2007

(65) Prior Publication Data
US 2008/0276858 A1 Nov. 13, 2008

(30) Foreign Application Priority Data
Nov. 29, 2005 (AU) .............................. 2005906633

(51) Int. Cl.
*B60P 1/28* (2006.01)
*B60Q 11/00* (2006.01)

(52) U.S. Cl. ....................... 116/28 R; 116/56

(58) Field of Classification Search ............... 116/28 R, 116/30, 35 R, 42, 51, 56; 40/589, 590, 591, 40/592
See application file for complete search history.

(56) References Cited

U.S. PATENT DOCUMENTS

| 2,887,672 | A | | 5/1959 | Morano et al. | |
|---|---|---|---|---|---|
| 3,789,357 | A | * | 1/1974 | Fritz, Jr. | 180/286 |
| 3,924,558 | A | * | 12/1975 | Di Grazia | 116/28 R |
| 4,418,636 | A | | 12/1983 | Piper | |
| 5,003,911 | A | * | 4/1991 | Keil | 116/28 R |
| 6,374,766 | B1 | * | 4/2002 | Clark | 116/28 R |
| 7,449,996 | B2 | * | 11/2008 | Hill | 340/457 |
| 7,642,906 | B1 | * | 1/2010 | McMurrer | 340/457 |

FOREIGN PATENT DOCUMENTS

| GB | 706200 | | 3/1954 |
|---|---|---|---|
| GB | 2303105 A | * | 2/1997 |
| JP | 61166739 A | * | 7/1986 |

* cited by examiner

*Primary Examiner*—R. A. Smith
(74) *Attorney, Agent, or Firm*—Brooks Kushman P.C.

(57) ABSTRACT

The present invention provides a tray position indicator including at least one elongated member, at least bracket member and an indication means whereby the tray position indicator provides a mechanical means of indicating and alerting a driver of the position of a tray of a rear-dump haul truck to reduce the likelihood of a driver driving away without first lowering the tray.

15 Claims, 3 Drawing Sheets

TRAY POSITION INDICATOR EXTENDING DOWN IN FRONT OF THE DRIVER WHEN THE TRAY IS IN RAISED POSITION

FIELD OF THE INVENTION

The invention relates to dump haul trucks, and in particular, to a tray position indicator for rear-dump haul trucks which provides a means of indicating and alerting a driver of the position of a tray of a rear-dump haul truck to prevent the driver from driving away without first lowering the tray.

Whilst the invention may also be applied to other trucks which may have a tray or carriage that moves from a lowered to a raised position, for convenience sake it shall be described herein in terms of rear-dump haul trucks.

BACKGROUND TO THE INVENTION

Rear-dump haul trucks are commonly used in the mining industry to transport coal or other goods around a mine site. These trucks are provided with trays which are raised in order to dump a load that the truck is carrying in a predetermined spot. The problem is that once the load has been dumped, occasionally the driver may drive away without remembering to first lower the tray. Such an instance can be hazardous as there is a potential for the raised tray of the truck to collide with an overpass or power lines or some other obstacle.

In order to overcome this problem, various electronic indicators have been developed which are adapted to be installed within the cabin of the truck and indicate to the driver that the tray is still in a raised position. These devices usually comprise a flashing light, or a speaker for a siren, to be installed within the cabin of the truck to attract the driver's attention before they drive away without first lowering the tray. The disadvantage of the prior art is that the devices are electronic and can easily fail due to their reliance on a power source for operation. In addition, if the bulb of the light is blown, or the siren sound fails to sound, the devices will fail to alert the driver of the tray's position. The prior art fails to provide a mechanical means of indicating and alerting the driver of the position of a tray provided on a rear-dump haul truck.

Accordingly, it is an object of the present invention to overcome or substantially ameliorate the disadvantages of the prior art by providing a tray position indicator for rear-dump haul trucks which provides a mechanical means of indicating and alerting a driver of the position of a tray of a rear-dump haul truck to reduce the likelihood of a driver driving away without first lowering the tray.

SUMMARY OF THE INVENTION

The present invention provides a tray position indicator including;

at least one elongated member;

at least bracket member; and an indication means whereby the tray position indicator provides a mechanical means of indicating and alerting a driver of the position of a tray of a rear-dump haul truck to reduce the likelihood of a driver driving away without first lowering the tray.

A first elongated member is preferably adapted to form the body portion for the tray position indicator. The elongated member is preferably adapted to be positioned lengthwise/vertically across the top of the truck so that it extends from the front of the rear-dump haul truck to the rear of the rear-dump haul truck.

The indication means is preferably in the form of a downwardly extending member that is adapted to extend down in front of the driver's view when the tray is in a raised position. The downwardly extending member preferably has provided a connecting portion and a plate member. The connecting portion is preferably adapted to enable the indication means to be connected to the second elongated member. The connecting portion preferably has provided an aperture which is adapted to receive a front end of the second elongated member therein. The plate member is preferably adapted to provide a signage means and/or allow a sign to be connected thereto via a suitable securing means.

The bracket member which is preferably adapted to connect the elongated member to the truck and provide a pivot point for the tray position indicator. The bracket member preferably has at least one connecting portion. A first connecting portion of the bracket member is preferably adapted to provide a connection means for the bracket member to the truck. The first connecting portion is preferably in the form a cylindrical or annular portion having a central aperture which is adapted to receive an attachment means therethrough. A second connecting portion is preferably adapted to provide a connections means for the bracket member to the elongated member. The second connecting portion is in the form of a clamp like member having two portions which are adapted to be connected together, via at least one suitable fastening means such as a screw or bolt or the like, to securely hold the elongated member.

In an alternate embodiment, the tray position indicator preferably comprises two elongated members which are adapted to be connected to the rear of the truck via bracket members having a single indication means connected between the two elongated members.

In order that the invention may be more readily understood we will describe by way of non-limiting example of a specific embodiment thereof.

BRIEF DESCRIPTION OF THE DRAWING FIGURES

DESCRIPTION OF A PREFERRED EMBODIMENT OF THE INVENTION

Figure 1:
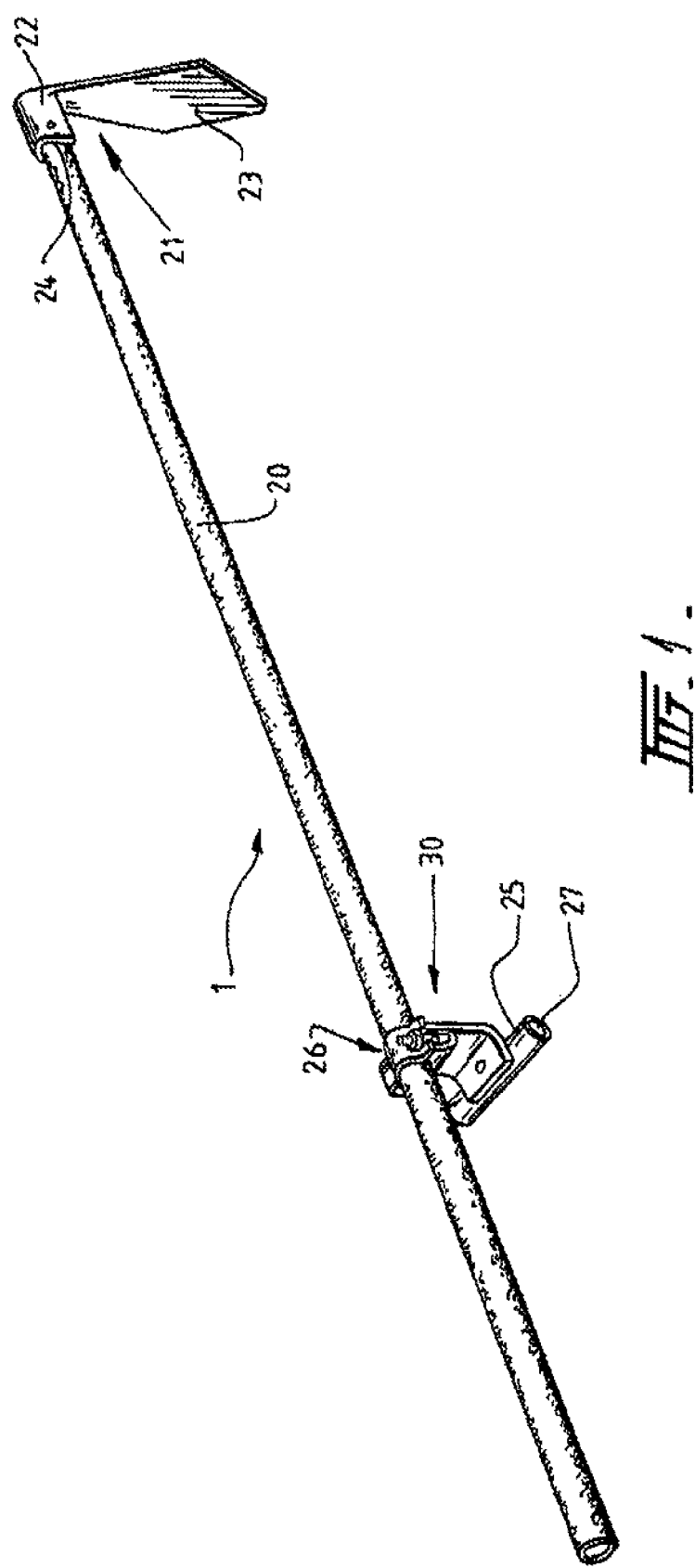
FIG. 1 shows the tray position indicator according to a preferred embodiment of the invention.
Figure 2:
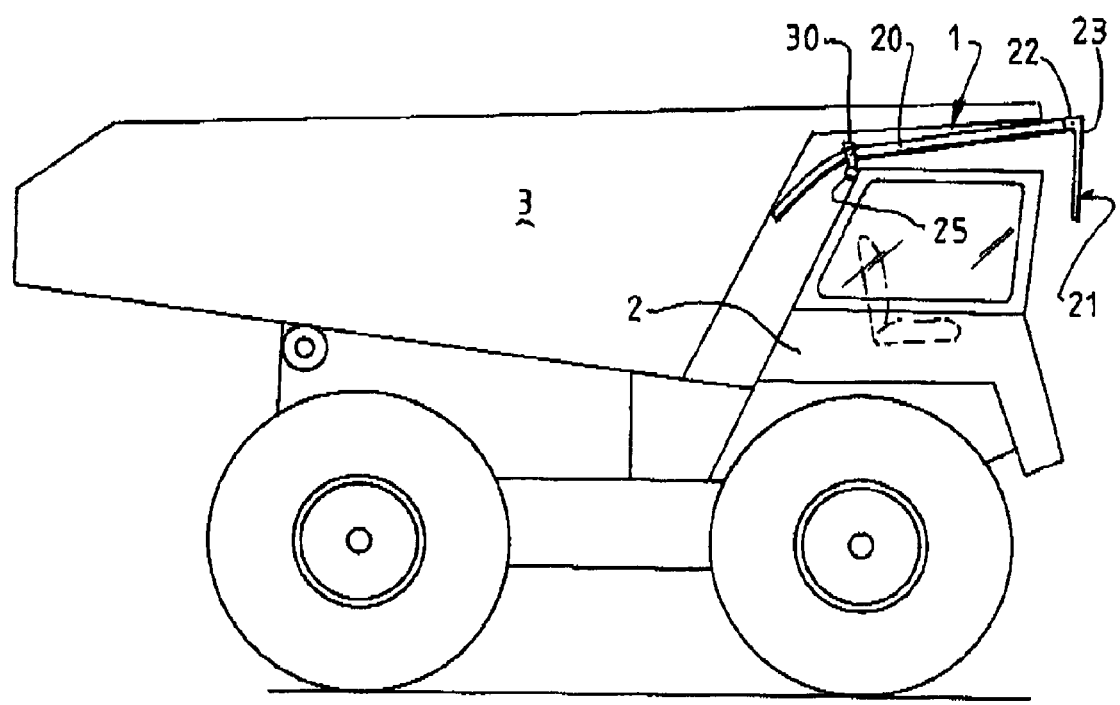
FIG. 2 shows the tray position indicator in a raised position, when the tray of the truck is lowered, according to a preferred embodiment of the invention.
Figure 3:
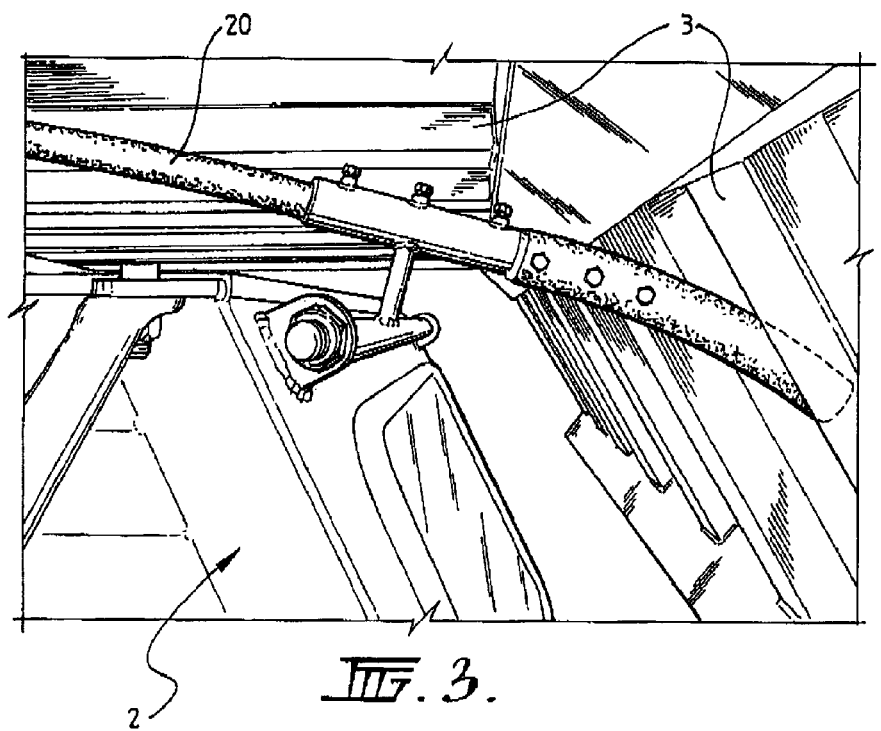
FIG. 3 shows an example of the attachment of the tray position indicator to the rear of the truck according to an embodiment of the invention.
Figure 4:
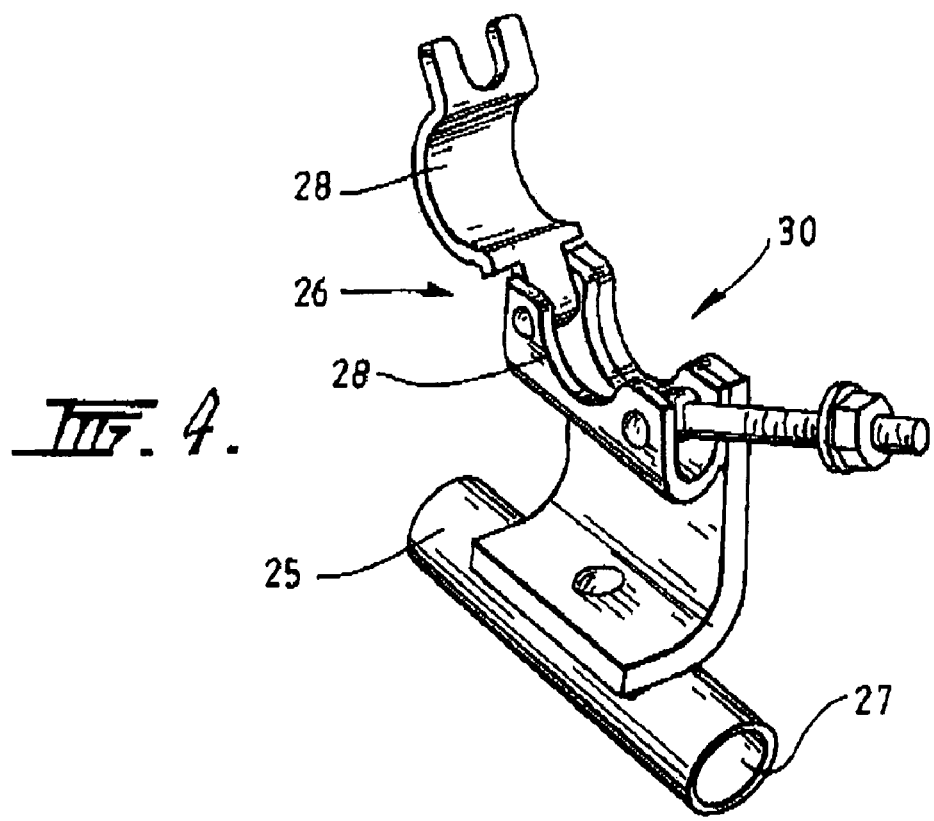
FIG. 4 shows an example of the bracket member of the tray position indicator according to a preferred embodiment of the invention.

FIGS. 1 to 4 show the tray position indicator according to a preferred embodiment of the invention.

In this preferred embodiment, the invention provides a tray position indicator 1 for rear-dump haul trucks which provides a mechanical means of indicating and alerting a driver of the position of a tray of a rear-dump haul truck to reduce the likelihood of a driver driving away without first lowering the tray. The tray position indicator 1 is preferably made of a polyethylene (poly) material, or any other suitable material which is strong, durable and flexible and meets the requirements of the invention. It is envisaged that the colour, shape and dimensions of the tray position indicator 1 may also be varied so that the tray position indicator 1 may be adapted for use with different sized and different model rear-dump haul trucks and/or other applications.

The tray position indicator 1 has provided at least one elongated member. In a preferred embodiment, the tray position indicator 1 preferably has provided a single elongated member 20 which is adapted to form the body portion for the tray position indicator 1. The elongated member 20 preferably has a cylindrical rod-like shape. However, it is envisaged that the elongated member 20 could also have a rectangular rod-like shape or any other suitable shape or form. The elongated member 20 is preferably hollow along the entire length of the elongated member 20. The elongated member 20 is preferably adapted to have a reinforcement means provided within the interior of the member 20 to provide additional strength and/or flexibility to the elongated member 20. However, in an alternate embodiment, it is envisaged that the elongated member 20 could be solid. The combination of the material and reinforcement should be such that the elongated member 20 is both flexible and strong to withstand the weight of a tray 3 placed thereon for a long period of time, whilst also having memory to return to its initial straightened form as soon as the tray 3 is raised so that gravity will force the front of the tray position indicator 1 in a downward direction.

The elongated member 20 is adapted to be positioned lengthwise/vertically across the top of the truck 2 so that it extends from the front of the rear-dump haul truck 2 to the rear of the rear-dump haul truck 2. The length of the elongated member 20 is preferably determined by the size of the truck 2 and tray 3 which it must pivot about to operate. The elongated member 20 is preferably connected to the truck 2 via a bracket member 30. The bracket member 30 is preferably positioned at a predetermined point along the back half of the elongated member 20 to provide a connection that is off-centre which in turn will provide the tray position indicator 1 with a see-saw mechanism whereby the weight of the tray position indicator 1 will be biased on the front side of the device 1.

Provided at the front end of the elongated member 20 is an indication means 21 which is adapted to indicate the position of the tray 3 to a driver. The indication means 21 is preferably in the form of a downwardly extending member that is adapted to extend down in front of the driver's view when the tray 3 is in a raised position. The downwardly extending member preferably has provided a connecting portion 22 and a plate member 23. The connecting portion 22 is preferably adapted to enable the indication means 21 to be connected to the second elongated member 20. The connecting portion 22 preferably has provided an aperture 24 which is adapted to receive a front end of the second elongated member 20 therein. The connecting portion 22 is preferably attached to the second elongated member 20 via a suitable securing means (not shown) such as a screw or bolt or the like. It is envisaged that the connecting portion 22 of the indication means 21 could also be integrally formed with the elongated member 20 and/or secured thereto via welding or any other suitable means. The plate member 23 is preferably integrally formed with, or welded to, the connecting portion 22 and is adapted to provide a signage means and/or allow a sign to be connected thereto via a suitable securing means such as a screw, rivet or bolt or the like. It is envisaged that the sign may vary depending on the particular machine or the purpose of the sign however, it is preferred that the sign may be coloured or have provided some other indicator which promotes safety and is adapted to make the sign noticeable and bring a driver's attention to the sign when it is in a lowered position indicating that the tray 3 position of the haul truck 2 is still raised.

The tray position indicator 1 has provided a bracket member 30 which is adapted to connect the elongated member 20 of the tray position indicator 1 to the truck 2 and provide a pivot point for the tray position indicator 1 to rotate about. The bracket member 30 preferably has at least one connecting portion. A first connecting portion 25 of the bracket member 30 is preferably adapted to provide a connection means to the truck 2. The first connecting portion 25 is preferably in the form a cylindrical or annular portion 25. The first connecting portion 25 preferably has provided a central aperture 27 which extends along the entire length of the cylindrical or annular portion 25 and is adapted to receive an attachment means (not shown) therethrough. The attachment means is adapted to provide connection to the truck 2 and can be a member which is attached to the truck and/or a member which can be attached to the truck 2 via a suitable securing/fastening means. In a preferred embodiment, the attachment means may be in the form of a rod-like member having at least one threaded portion for receiving a securing means, such as nut or the like, in order to fasten the attachment means and tray position indicator 1 to the truck 2. Alternatively, the attachment means may also be in the form of a bolt or any other suitable attachment means. It is further envisaged that the style of the first connecting portion 25 may be modified to suit a different attachment means.

In a preferred embodiment of the invention, a second connecting portion 26 of the bracket member 30 is adapted to provide a connections means for the bracket member 30 to the elongated member 20. The second connecting portion 26 may preferably be in the form of a clamp like member having two portions 28 which are adapted to be connected together, via at least one suitable fastening means such as a screw or bolt or the like, to securely hold the elongated member 20 within the grasp of the second connecting portion 26. It is envisaged that second connecting portion 26 can also take on any other suitable form so long as it is capable of securely holding the elongated member 20 therein. In an alternate embodiment, the second connecting portion may be integrally formed with, or welded to, the second elongated member. In a further embodiment of the invention, the bracket member 30 may be hinged or may have provided a moveable joint member such that the bracket member may be able to act as a pivot point for the tray position indicator 1 enabling the bracket member 30 to be rigidly fixed to the rear of the dump haul truck whilst the elongated member 20 can be rotatable thereabout.

In practice, the tray position indicator 1 is attached and secured to the rear of the rear-dump haul truck. When the tray 3 of the truck 2 is in a normal lowered position the bottom of the tray and weight of the tray is place on the back end of the second elongated member 20 to raise the front end of the tray position indicator 1 so that the downwardly extending sign 21 is not blocking the driver's view. Once the tray 3 is raised, the weight will be lifted from the tray position indicator 1 and gravity will cause the sign 21 provided at the front end of the elongated member 20 to fall in front of, and obstruct, the driver's view and indicate and bring to their attention the fact that the tray 3 is still in a raised position requiring that it be lowered before driving away.

In a further embodiment of the invention, the tray position indicator 1 may comprise two elongated members 20 which are adapted to be connected to the rear of a rear-dump haul truck 2 via bracket members 30. The two elongated members are adapted to be arranged and connected on either side of the truck 2 so that they are parallel and spaced apart. In the embodiment, the indication means 21 is adapted to be large enough so that it is connected to, and operated by, both elongated members 20. This arrangement is particularly useful for larger trucks to ensure that the indication means 21 and warning is prominently displayed in front of the driver so that it cannot be ignored.

While we have described herein a particular embodiment of the tray position indicator 1, it is further envisaged that other embodiments of the invention could exhibit any number and combination of any one of the features previously described. However, it is to be understood that any variations and modifications can be made without departing from the spirit and scope thereof.

I claim:

1. A tray position indicator for a rear-dump haul truck including:
    at least one elongated member;
    at least one bracket member connected to the at least one elongated member and is adapted to connect the elongated member to the truck to provide a pivot point for the tray position indicator; and
    an indication means whereby the tray position indicator provides a mechanical means of indicating and alerting a driver of the position of a tray of a rear-dump haul truck to reduce the likelihood of a driver driving away without first lowering the tray;
    wherein the at least one elongated member includes a first elongated member that is adapted to form a body portion for the tray position indicator, and wherein the first elongated member is adapted to be positioned lengthwise along the top of the truck so that it extends substantially from the front of the rear-dump haul truck to substantially the rear of the rear-dump haul truck.

2. A tray position indicator as claimed in claim 1 wherein the indication means is in the form of a downwardly extending member that is adapted to extend down in front of the driver's view when the tray is in a raised position.

3. A tray position indicator as claimed in claim 2 wherein the downwardly extending member has provided a connecting portion and a plate member.

4. A tray position indicator as claimed in claim 3 wherein the connecting portion is adapted to enable the indication means to be connected to the at least one elongated member.

5. A tray position indicator as claimed in claim 3 wherein the connecting portion has provided an aperture which is adapted to receive a front end of the at least one elongated member therein.

6. A tray position indicator as claimed in claim 3 wherein the plate member is adapted to provide a signage means and/or allow a sign to be connected thereto via a suitable securing means.

7. A tray position indicator as claimed in claim 1 wherein the bracket member is adapted to connect the at least one elongated member to the truck and provide a pivot point for the tray position indicator.

8. A tray position indicator as claimed in claim 7 wherein the bracket member has at least one connecting portion.

9. A tray position indicator as claimed in claim 8 wherein a first connecting portion of the bracket member is adapted to provide a connection means for the bracket member to the truck.

10. A tray position indicator as claimed in claim 9 wherein the first connecting portion is preferably in the form a cylindrical or annular portion having a central aperture which is adapted to receive an attachment means therethrough.

11. A tray position indicator as claimed in claim 8 wherein a first connecting portion of the bracket member provides a pivot point for the tray position indicator to rotate about.

12. A tray position indicator as claimed in claim 1 wherein the at least one elongated member is flexible and strong to withstand the weight of a tray placed thereon and having a memory to return to a straightened orientation when the tray is raised so that gravity will force the front of the tray position in a downward direction.

13. A tray position indicator as claimed in claim 1 wherein the bracket member is positioned at a predetermined point along the back half of the elongated member to provide a connection that is off center which will provide the tray position indicator with a see-saw mechanism.

14. A tray position indicator as claimed in claim 1 wherein the elongated member moves from a first position wherein the indication means is in a raised position as the weight of the tray provides a downward force onto the at least one elongated member such that the at least one elongated member flexes to withstand the force of the weight of the tray, to a second position wherein the indication means is in a lowered position as the lifting of the tray removes the downward force of the tray to allow the elongated member to straighten thereby allowing gravity to direct one end of the elongated member to move in a downward direction.

15. A tray position indicator including:
    at least one elongated member;
    at least one bracket member each having at least one connecting portion; and
    an indication means whereby the tray position indicator provides a mechanical means of indicating and alerting a driver of the position of a tray of a rear-dump haul truck to reduce the likelihood of a driver driving away without first lowering the tray;
    wherein the at least one bracket member is adapted to connect the elongated member to the truck and provide a pivot point for the tray position indicator, and wherein the at least one connecting portion is adapted to provide a connection means for the bracket member to the truck, and wherein the at least one connecting portion is preferably in the form of a cylindrical or annular portion having a central aperture which is adapted to receive an attachment means therethrough.

* * * * *